United States Patent [19]

Jacobs

[11] 4,098,537

[45] Jul. 4, 1978

[54] BICYCLE SADDLE

[75] Inventor: David L. Jacobs, Boulder, Colo.

[73] Assignee: The Jacobs Corporation, Boulder, Colo.

[21] Appl. No.: 775,230

[22] Filed: Mar. 7, 1977

[51] Int. Cl.² .............................................. B62J 1/00
[52] U.S. Cl. ..................................... 297/195; 297/201
[58] Field of Search ............... 297/195, 204, 207, 202, 297/203, 201

[56] References Cited

U.S. PATENT DOCUMENTS

| 536,538 | 3/1895 | McIntire | 297/195 X |
|---|---|---|---|
| 609,459 | 8/1898 | Pansaro | 197/204 |
| 682,425 | 9/1901 | Ray et al. | 297/195 |
| 1,518,157 | 12/1924 | Linder | 297/207 |
| 3,844,611 | 10/1974 | Young | 297/195 X |

FOREIGN PATENT DOCUMENTS

| 2,224,339 | 3/1973 | France | 297/195 |
|---|---|---|---|
| 564,450 | 7/1975 | Switzerland | 297/195 |

Primary Examiner—Roy D. Frazier
Assistant Examiner—Peter A. Aschenbrenner
Attorney, Agent, or Firm—John J. Byrne

[57] ABSTRACT

A bicycle saddle including a narrow leading end portion, a central transition portion and a wider trailing end portion. A transverse rib extends across the saddle at the central transition portion and imparts flexural stiffness to the saddle. A longitudinal tension rib extends from the central transition portion to the wider trailing end and separates relatively thin and flexible pelvic zones fashioned within the wider trailing end portion.

4 Claims, 5 Drawing Figures

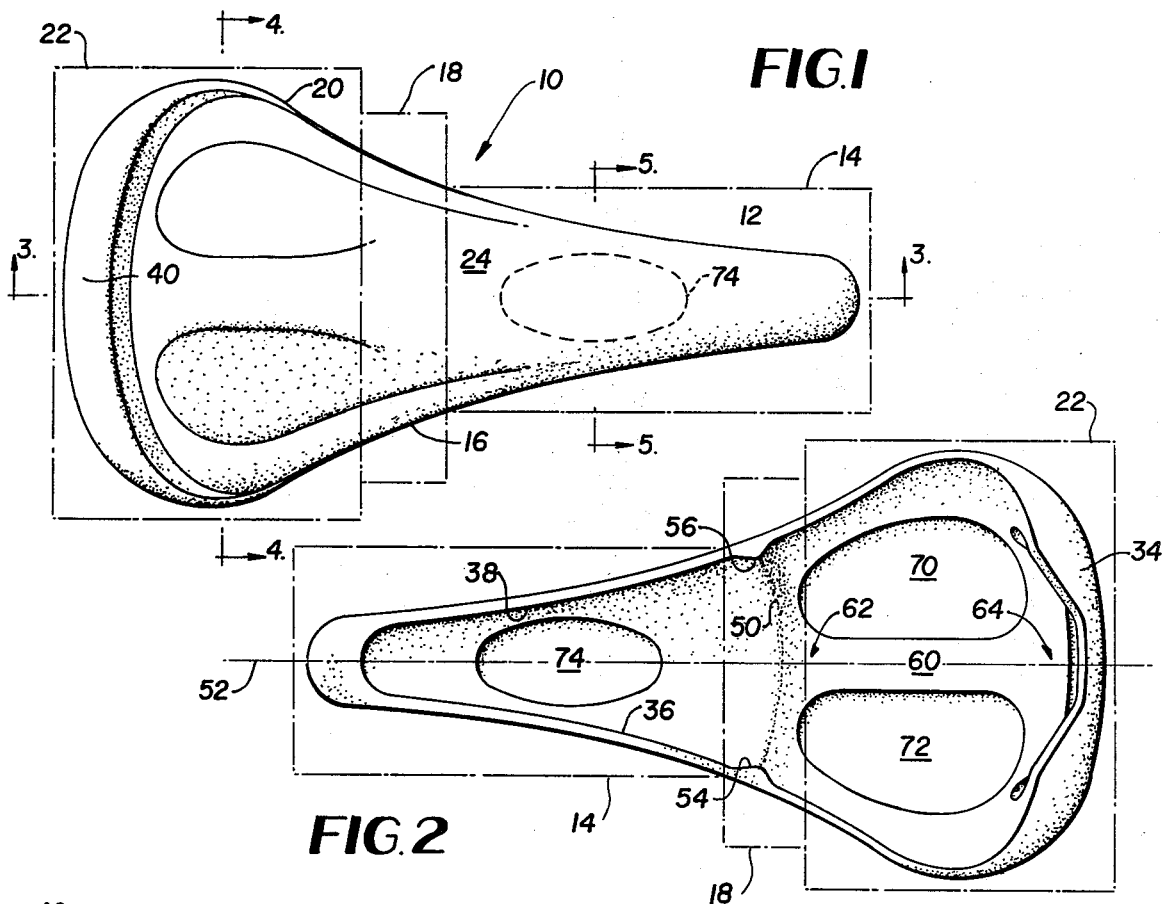
FIG.1
FIG.2
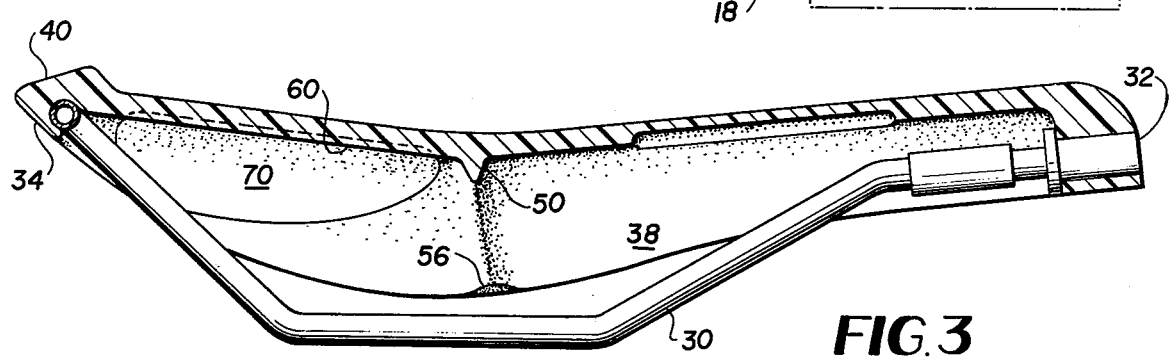
FIG.3
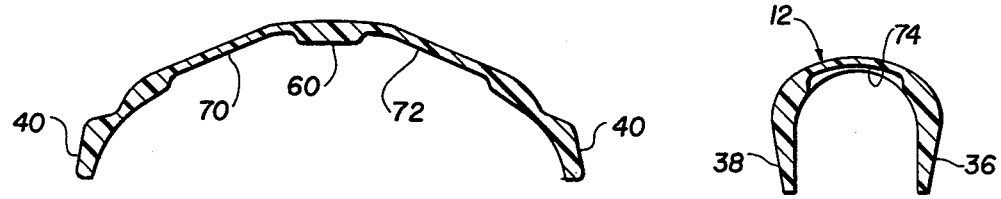
FIG.4
FIG.5

_(4,098,537)_

BICYCLE SADDLE

BACKGROUND OF THE INVENTION

This invention relates to bicycle seats. More specifically, this invention relates to improvements in the saddle portion of a bicycle seat and is intended to optimize the qualities of seat performance and user comfort.

At the present time many general purpose bicycle saddles and high performance bicycle saddles are designed with a narrow leading end portion, a central transition portion and a wider or flaired trailing end portion. The bicycle saddle is further fashioned with downwardly contoured side panels and the front and rear ends thereof include a downwardly projecting tip and an anchor respectively. A generally steel rod and tubular frame underlies and supports the saddle between the tip and anchor in a posture above a bicycle saddle post.

Comfort and performance are major design criteria for a bicycle saddle. These criteria are mutually interrelated and determined to a significant extent by saddle flexure. In this connection at least some degree of saddle flexure is desirable to provide a comfortable support for a cyclist. Points of pressure normally exist where a user's pelvic bones rest upon the saddle. On the other hand, excessive flexure must be avoided as vertical movement tends to promote irritation and soreness. Moreover, in performance cycles, vertical movement of a cyclist's body causes a loss of positive driving thrust on the cycle peddles. Some of the driving thrust is lost in flexing the saddle up and down.

Although considerable effort, and significant advances, have been realized in achieving comfort and performance through the development of bicycle seat pads and bicycle seat frames, insufficient attention has been placed upon saddle design per se. In this regard it is believed that room for significant improvement exists with regard to conventional leather or polyurethane composition saddles exhibiting leather-like properties.

OBJECTS OF THE INVENTION

Accordingly it is a general object of the invention to provide a bicycle saddle having improved comfort and performance characteristics.

It is a specific object of the invention to provide a bicycle saddle having improved flexure and stiffness qualities.

It is another object of the invention to provide a bicycle saddle having improved longitudinal stiffness and concomitantly pelvic and pubic zone flexure.

It is a further object of the invention to provide a bicycle saddle having improved transverse resistance to flexure.

THE DRAWINGS

Other objects of and advantages of the present invention will become apparent from the following detailed description of a preferred embodiment taken in conjunction with the accompanying drawings wherein:

FIG. 1 is a plan view of a bicycle saddle having a narrow leading end portion; a central transition portion and a flaired trailing end portion;

FIG. 2 is a bottom view of the bicycle saddle depicted in FIG. 1;

FIG. 3 is a cross-sectional view taken along section line 3—3 in FIG. 1 wherein a tubular or solid support frame added to disclose a means for supporting the saddle upon a bicycle;

FIG. 4 is a cross-sectional view taken along section line 4—4 in FIG. 1 and discloses the relative thickness of a longitudinal tension rib and adjacent pelvic zones of the saddle; and FIG. 5 is a cross-sectional view taken along section line 5—5 and discloses the saddle structure at said narrow leading end portion thereof.

DETAILED DESCRIPTION

Referring now particularly to FIG. 1 there will be seen a bicycle saddle 10. The saddle 10 includes a narrow leading end portion 12 as generally embraced within outline 14; a central transition portion 16 as generally embraced within outline 18; and a flaired or wider trailing end portion 20 as generally embraced within outline 22.

The saddle 10 is advantageously fabricated from a polyurethane composition having leather-like properties.

In many instances it may be desirable to connect an elongated pad, not shown, to the upper surface 24 of the saddle to enhance rider comfort and saddle performance as previously mentioned. Such an advantageous pad is disclosed and claimed in applicant's U.S. application Ser. No. 465,385 now U.S. Pat. No. 3,997,214. The disclosure of this patent is incorporated by reference as though set forth at length.

Another previously noted technique to enhance comfort and performance characteristics of the bicycle seat is to provide a tubular or solid rod frame assembly 30, note FIG. 3, which is longitudinally adjustable to selectively alter longitudinal tension and thus flexibility of the saddle. In this regard, the frame assembly extends between a downwardly extended tip 32 at the leading end of the saddle and an anchor 34 at the trailing end thereof. For a further and more detailed description of an advantageous frame assembly reference may be had to applicant's copending U.S. application Ser. No. 775,231 filed on an even date herewith and entitled "Apparatus For Adjusting Tension In A Bicycle Saddle". The disclosure of this patent is also incorporated by reference as though set forth at length.

Returning now to FIGS. 1 and 2 there will be seen top and bottom views of a preferred embodiment of a saddle structure which forms the subject matter of the instant invention.

As previously noted the saddle 10 may be thought of as comprising three portions entailing a leading end 12, a central portion 16 and a trailing portion 20. The sides of the saddle are fashioned from contoured panels 36 and 38 which extend vertically downward, note FIG. 5, and enhance longitudinal stiffness of the saddle as well as shield the underlying frame 30 from user contact. The trailing end of the saddle includes a raised rim 40 which extends above an anchor lip 34 as previously noted.

The central transition portion 16 of the saddle is provided with an underlying raised rib 50 which transversely extends across the saddle at approximately right angles to a central longitudinal axis 52 of the saddle. The raised rib 50 extends from the lowermost edge of one side panel 36, as at 54, continuously to the lowermost edge of the other side panel 38, as at 56. This continuous transverse rib 50 has been advantageously found to inhibit both inward and outward flairing action of the side panels 36 and 38 when a cyclist is mounted upon the bicycle seat. The transverse rib 50 thereby enhances longitudinal stiffness of the saddle.

The trailing end portion 20 of the saddle is fashioned with a longitudinally extending rib 60 which projects downwardly beneath the saddle from a position juxtaposed to said transverse rib, as at 62 and at approximately right angles thereto, to approximately the end most portion of the saddle as at 64.

Relatively, thin and flexible pelvic zones 70 and 72 are formed on opposite sides of rib 60 in a posture designed to underlie and support the pelvic bone zones of a cyclist when sitting upon the bicycle seat. In a similar view a relatively thin and flexible pubic zone 74 is fashioned in a forward portion of the saddle and in front of rib 60.

The longitudinal rib 60 in cooperation with the remaining portions of the saddle serve to carry axial tension imparted by the underlying frame 30 which enhances a desired longitudinal stiffness and performance of the saddle while the relatively thin pelvic zones provide a degree of cushioning action at pressure points which enhances user comfort.

In describing a bicycle saddle in accordance with a preferred embodiment of the invention, those skilled in the art will now recognize several advantages which singularly distinguish the subject invention from prior bicycle saddles.

A particular advantage of the invention is the transverse rib 50 which controls side panel flairing and thus contributes to the stiffness and performance characteristics of the saddle.

Another striking feature is the longitudinal rib and adjacent thinner pelvic zones which concomitantly enhance saddle stiffness and performance and saddle flexibility at selective pressure points and thus user comfort.

In describing the invention, reference has been made to a preferred embodiment of the invention. Those skilled in the art, however, and familiar with the subject disclosure, may recognize additions, deletions, modifications, substitutions and/or other changes which will fall within the purview of the invention as defined in the following claims.

What is claimed is:

1. A bicycle saddle including a narrow, leading end portion having a downwardly turned tip; a central transition portion; a flaired, trailing end portion, wherein an adjustable frame may be operably positioned between said trailing end portion and said leading end portion to underlie and support said saddle and impart longitudinal stiffening tension to said saddle; and downwardly contoured side panels on each side of said saddle, wherein the improvement comprises:

a central, longitudinal tension rib extending at least approximately from said central transition portion to approximately said trailing end portion;

a first relatively thin and flexible pelvic zone lying along one side of said tension rib for flexibly supporting one portion of the pelvic area of a cyclist, a second relatively thin and flexible pelvic zone lying along the other side of said tension rib for flexibly supporting another portion of the pelvic area of a cyclist, wherein said central, longitudinal tension rib carries longitudinal stiffening tension from at least the central transition portion of the saddle to the trailing end portion while said first and second relatively thin pelvic zones provide a degree of resiliency and cyclist comfort; and wherein said bicycle saddle is fabricated as a unitary composition wherein said central longitudinal tension rib and said first and second relatively thin and flexible pelvic zones are an integral part of the saddle structure.

2. A bicycle saddle as defined in claim 1 wherein the improvement further comprises:

a transverse rib extending across said saddle at said central transition portion thereof at approximately right angle to said longitudinal tension rib for imparting flexural stiffening to said saddle.

3. A bicycle saddle as defined in claim 2 wherein:

said transverse rib extends from the edge of one of said side panels across said saddle and terminates at the edge of the other one of said side panels wherein resistance is provided to flairing flexure of the side panels of said saddle.

4. A bicycle saddle as defined in claim 1 and further comprising:

a third relatively thin and flexible zone positioned upon a longituidnal axis extending from the leading end to the trailing end of the saddle in a position toward the leading end of the saddle with respect to said first and second relatively thin and flexible pelvic zone areas.

* * * * *